US 9,108,790 B2

(12) United States Patent
Daley

(10) Patent No.: US 9,108,790 B2
(45) Date of Patent: Aug. 18, 2015

(54) DIVIDER AND CUTTING BOARD

(71) Applicant: Jeffry A. Daley, Richmond, TX (US)

(72) Inventor: Jeffry A. Daley, Richmond, TX (US)

(*) Notice: Subject to any disclaimer, the term of this patent is extended or adjusted under 35 U.S.C. 154(b) by 37 days.

(21) Appl. No.: 13/862,604

(22) Filed: Apr. 15, 2013

(65) Prior Publication Data

US 2013/0284619 A1 Oct. 31, 2013

Related U.S. Application Data

(60) Provisional application No. 61/638,342, filed on Apr. 25, 2012.

(51) Int. Cl.
| B65D 1/24 | (2006.01) |
| B65D 1/36 | (2006.01) |
| B65D 57/00 | (2006.01) |
| B65D 85/00 | (2006.01) |
| B65D 81/36 | (2006.01) |
| A47J 47/00 | (2006.01) |
| B65D 81/38 | (2006.01) |

(52) U.S. Cl.
CPC ............ *B65D 81/361* (2013.01); *A47J 47/005* (2013.01); *B65D 81/3813* (2013.01); *Y10T 29/49826* (2015.01)

(58) Field of Classification Search
CPC .. B65D 81/361; B65D 81/3813; A47J 47/005
USPC ........... 220/527–529, 532–534, 543, 544, 220/592.16, 592.2, 592.21, 592.24, 592.26, 220/23.2, 23.4, 507, 500, 510; 269/14, 54; 40/374; 206/449, 425, 307, 308.1, 206/308.3, 309, 311, 387.1; 211/13.1, 40, 211/184
See application file for complete search history.

(56) References Cited

U.S. PATENT DOCUMENTS

| 418,507 A | * | 12/1889 | Dowe ............................ 217/7 |
| 788,276 A | * | 4/1905 | Nowotny ..................... 220/543 |
| 1,677,544 A | * | 7/1928 | Gourley et al. ............... 312/117 |
| 1,833,081 A | * | 11/1931 | Kilmer .......................... 217/36 |
| 2,169,562 A | * | 8/1939 | Lombardini .................. 220/544 |
| 2,743,774 A | * | 5/1956 | Pinto ............................ 160/351 |
| 2,923,070 A | * | 2/1960 | Resnick ........................ 434/219 |
| 3,200,983 A | * | 8/1965 | Walter .......................... 220/533 |
| 3,544,182 A | * | 12/1970 | Tainter ......................... 312/237 |
| 3,807,572 A | * | 4/1974 | Luvara et al. ................. 211/10 |
| 4,261,465 A | * | 4/1981 | Thomas ........................ 206/708 |
| 4,510,770 A |   | 4/1985 | Vella |

(Continued)

FOREIGN PATENT DOCUMENTS

AU 2012101420 A4 10/2012

OTHER PUBLICATIONS

Canyon Coolers Web Page; www.CanyonCoolers.com, date accessed: Mar. 12, 2013, 3 pages.

*Primary Examiner* — Anthony Stashick
*Assistant Examiner* — Jennifer N Zettl
(74) *Attorney, Agent, or Firm* — Conley Rose, P.C.

(57) ABSTRACT

A system (and method) for use with a cooler having a plurality of interior, opposed vertical channels comprises a cutting board and a cutting board holding assembly. The cutting board holding assembly comprises a first vertical side wall coupled to and positioned opposite a second vertical side wall, the first and second side walls defining a receptacle configured to receive the cutting board. Further, the first and second side walls are configured to slidingly engage two opposed vertical channels of a cooler.

19 Claims, 3 Drawing Sheets

(56) References Cited

U.S. PATENT DOCUMENTS

| | | | |
|---|---|---|---|
| 4,527,694 A * | 7/1985 | Bolt et al. | 211/46 |
| 4,655,052 A | 4/1987 | Garcia | |
| RE32,740 E * | 8/1988 | Steffes | 312/351 |
| 4,776,481 A * | 10/1988 | Kidd | 220/532 |
| 4,828,133 A * | 5/1989 | Hougendobler | 220/533 |
| 4,889,232 A * | 12/1989 | Asleson | 206/449 |
| 4,889,253 A * | 12/1989 | Schmulian et al. | 220/551 |
| 4,901,876 A * | 2/1990 | Box | 220/533 |
| 5,050,768 A * | 9/1991 | Alden | 220/551 |
| 5,119,950 A * | 6/1992 | Takemura | 206/425 |
| 5,201,414 A * | 4/1993 | Kaszubinski | 206/308.1 |
| 5,301,508 A * | 4/1994 | Kahl et al. | 62/3.62 |
| 5,334,904 A * | 8/1994 | Kramer | 312/9.57 |
| 5,373,708 A | 12/1994 | Dumoulin, Jr. | |
| 5,396,996 A * | 3/1995 | Box | 211/46 |
| 5,464,091 A * | 11/1995 | Callahan et al. | 206/308.3 |
| 5,484,078 A * | 1/1996 | Bronovicki | 220/531 |
| 5,493,874 A * | 2/1996 | Landgrebe | 62/457.2 |
| 5,499,473 A * | 3/1996 | Ramberg | 43/55 |
| 5,505,299 A * | 4/1996 | Ditzig et al. | 206/308.1 |
| 5,586,650 A * | 12/1996 | Yeh | 206/308.1 |
| 5,685,439 A * | 11/1997 | Luenser | 211/183 |
| 5,715,948 A * | 2/1998 | Hung | 211/40 |
| 5,746,325 A * | 5/1998 | Lee | 211/40 |
| 5,788,088 A * | 8/1998 | Kao | 211/40 |
| 5,853,091 A * | 12/1998 | Luenser | 211/40 |
| 6,039,202 A * | 3/2000 | Olstad et al. | 220/533 |
| 6,112,910 A * | 9/2000 | Baxter | 211/40 |
| 6,196,647 B1 * | 3/2001 | Kupferschmid | 312/9.48 |
| 6,523,482 B2 * | 2/2003 | Wingate | 105/355 |
| 6,726,050 B1 | 4/2004 | Barentine et al. | |
| 6,782,711 B2 * | 8/2004 | Abfalter | 62/457.7 |
| 6,886,693 B1 * | 5/2005 | Davenport et al. | 206/494 |
| 7,028,498 B2 | 4/2006 | Monroe et al. | |
| 7,172,258 B2 * | 2/2007 | Bisson et al. | 312/348.3 |
| 7,190,574 B2 * | 3/2007 | Muenzer et al. | 361/679.32 |
| 7,306,243 B2 | 12/2007 | Van Horn | |
| 7,322,485 B2 * | 1/2008 | Bradford et al. | 220/507 |
| 7,389,608 B1 | 6/2008 | MacKay | |
| 7,506,757 B1 * | 3/2009 | Ater et al. | 206/315.1 |
| 7,591,093 B2 * | 9/2009 | Saylor | 40/488 |
| 7,660,112 B2 * | 2/2010 | Carr et al. | 361/679.58 |
| 7,921,998 B2 * | 4/2011 | Schenker | 206/425 |
| 7,984,820 B2 * | 7/2011 | Dancyger | 220/532 |
| 8,011,503 B2 * | 9/2011 | Hartman | 206/308.1 |
| 8,303,902 B2 * | 11/2012 | Kim | 422/198 |
| 8,770,432 B2 * | 7/2014 | Rueckheim et al. | 220/523 |
| 8,857,654 B2 * | 10/2014 | Mogil et al. | 220/592.2 |
| 2002/0126920 A1 * | 9/2002 | Mogil | 383/110 |
| 2004/0238543 A1 * | 12/2004 | Askew | 220/529 |
| 2004/0262319 A1 | 12/2004 | Fisher | |
| 2006/0021884 A1 * | 2/2006 | Castritis | 206/308.1 |
| 2006/0180486 A1 * | 8/2006 | Bennett | 206/308.1 |
| 2007/0101754 A1 * | 5/2007 | Maldonado | 62/389 |
| 2009/0025417 A1 | 1/2009 | Azzara | |
| 2009/0045204 A1 * | 2/2009 | Marganski | 220/592.03 |
| 2011/0154852 A1 | 6/2011 | Cavazos | |
| 2011/0203297 A1 | 8/2011 | Oberweis | |
| 2011/0226785 A1 | 9/2011 | Sakell | |

* cited by examiner

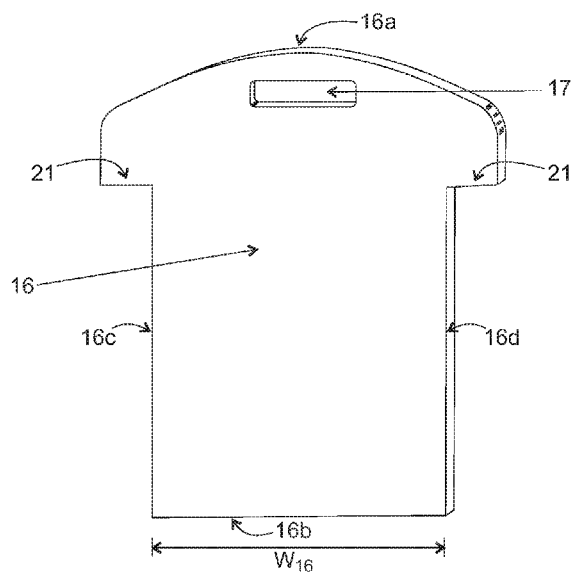
Figure 3A
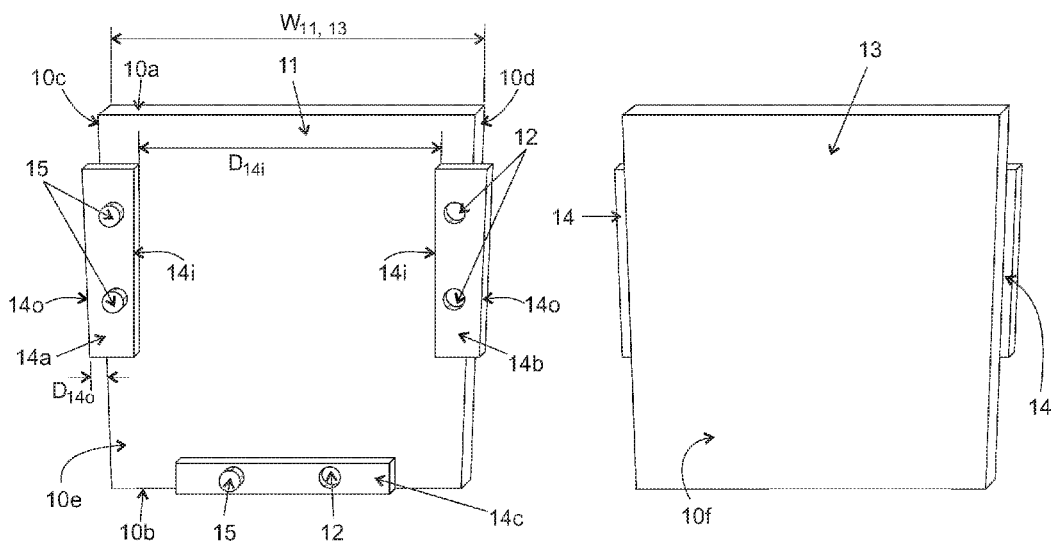
Figure 3B  Figure 3C

DIVIDER AND CUTTING BOARD

CROSS-REFERENCE TO RELATED APPLICATIONS

This application claims benefit of U.S. provisional patent application Ser. No. 61/638,342 filed Apr. 25, 2012, and entitled "Divider and Cutting Board," which is hereby incorporated herein by reference in its entirety.

STATEMENT REGARDING FEDERALLY SPONSORED RESEARCH OR DEVELOPMENT

Not applicable.

BACKGROUND

The invention relates generally to ice chests/coolers typically used for picnics, tailgating, fishing, and other outdoor activities. More specifically, the invention relates to a cutting board assembly that provides for the storage of a cutting board while keeping a divider in place during use of the cutting board. Coolers are known in the art and typically comprise an insulated compartment to keep items cool and all items placed in the cooler are typically intermixed.

BRIEF SUMMARY OF THE DISCLOSURE

In one embodiment, a system is provided for use with a cooler having a plurality of interior, opposed vertical channels. The system may comprise a cutting board and a cutting board holding assembly. In addition, the cutting board holding assembly comprises a first vertical side wall coupled to and positioned opposite a second vertical side wall, the first and second side walls defining a receptacle configured to receive the cutting board. Further, the first and second side walls are configured to slidingly engage two opposed vertical channels.

Another embodiment is directed to a system for a cooler. The system may comprise a container having opposing front and back walls, opposing left and right walls, a bottom, a lid, and a plurality of opposing vertical channels disposed on the front and back walls. In addition, the system comprises a cutting board and a cutting board holding assembly. Further, the cutting board holding assembly comprises a first vertical side wall coupled to and positioned opposite a second vertical side wall, the first and second side walls defining a receptacle configured to receive the cutting board. Moreover, the first and second side walls are configured to slidingly engage two opposed vertical channels of the front and back walls of the container.

A method is disclosed for storing a cutting board within a cooler. The method comprises coupling a first vertical side wall to a second vertical side wall creating a receptacle defined by a gap between the first and second vertical side walls. Further, the method comprises installing the coupled first and second vertical side walls into opposed vertical channels disposed in the cooler. In addition, the method comprises inserting a cutting board into the receptacle between the first and second vertical side walls.

Embodiments described herein comprise a combination of features and advantages intended to address various shortcomings associated with certain prior devices, systems, and methods. The foregoing has outlined rather broadly the features and technical advantages of the invention such that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments, reference will now be made to the accompanying drawings in which:

FIG. 3A is an enlarged schematic view of a cutting board in accordance with principles disclosed herein;

FIG. 3B is an enlarged schematic view of a portion of the system shown in FIG. 1; and FIG. 3C is an enlarged schematic view of a portion of the system shown in FIG. 1.

DETAILED DESCRIPTION OF THE PREFERRED EMBODIMENTS

Figure 1:
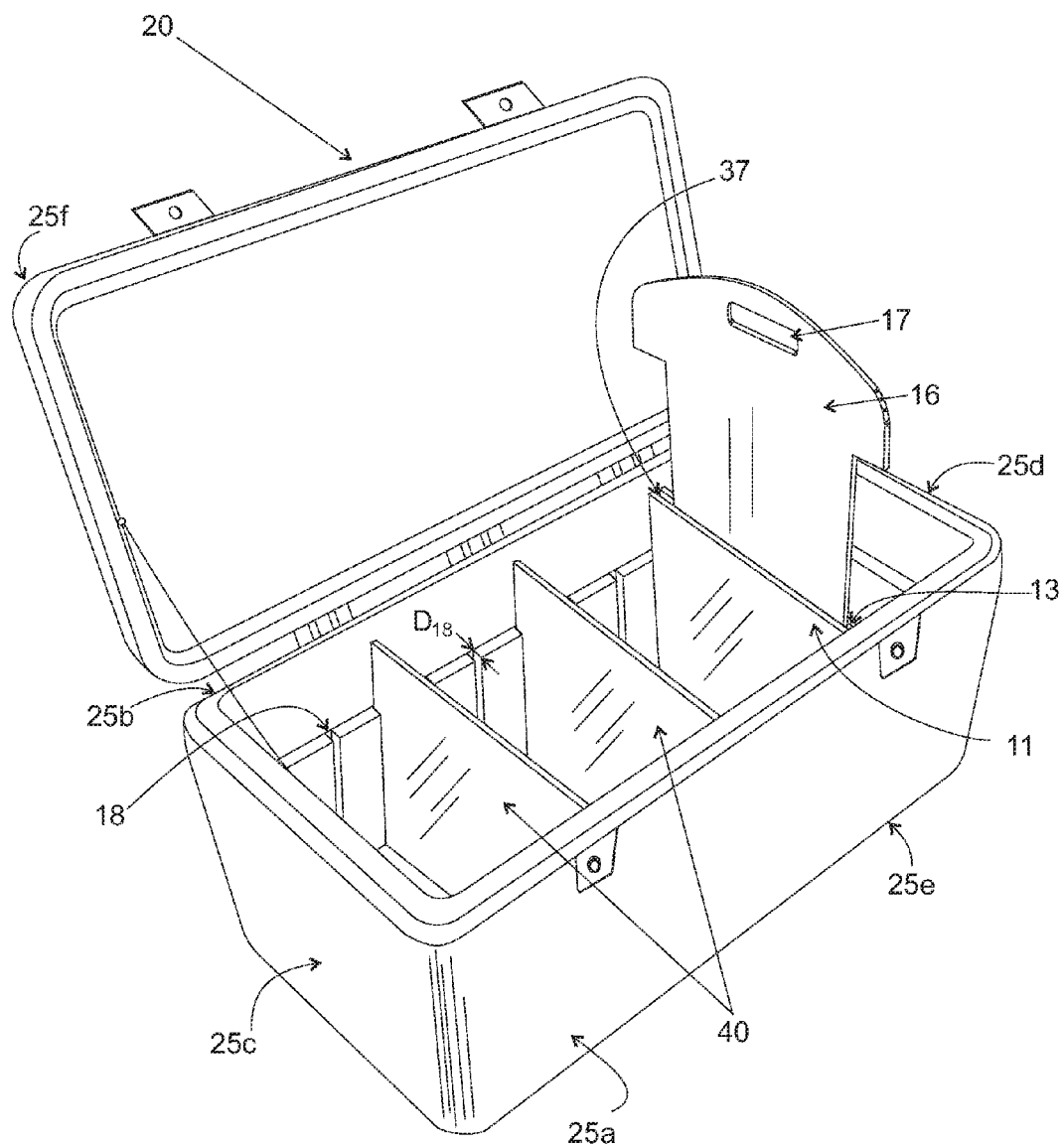
FIG. 1 is a schematic perspective view of a cooler and cutting board system in accordance with the principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosures, including the claims, is limited to that embodiment.

Certain terms are used throughout the following description and claim to refer to particular system components. This document does not intend to distinguish between components that differ in name but not function. Moreover, the drawing figures are not necessarily to scale. Certain features of the invention may be shown exaggerated in scale or in somewhat schematic form, and some details of conventional elements may not be shown in the interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Referring now to FIG. 1, an ice chest or cooler 20 comprises a container 25, cutting board system 30, and dividers 40. The container 25 comprises a front wall 25*a*, back wall 25*b*, left wall 25*c* opposite right wall 25*d*, a bottom 25*e*, a lid 25*f*, and a plurality of opposing vertical channels 18 having a depth $D_{18}$ and disposed on the front and back walls 25*a*, 25*b*, respectively. Any ice chest or cooler 20 standard in the art, including any make, model, or size, may be used if the cooler includes at least one set of opposing vertical channels 18.

Figure 2:
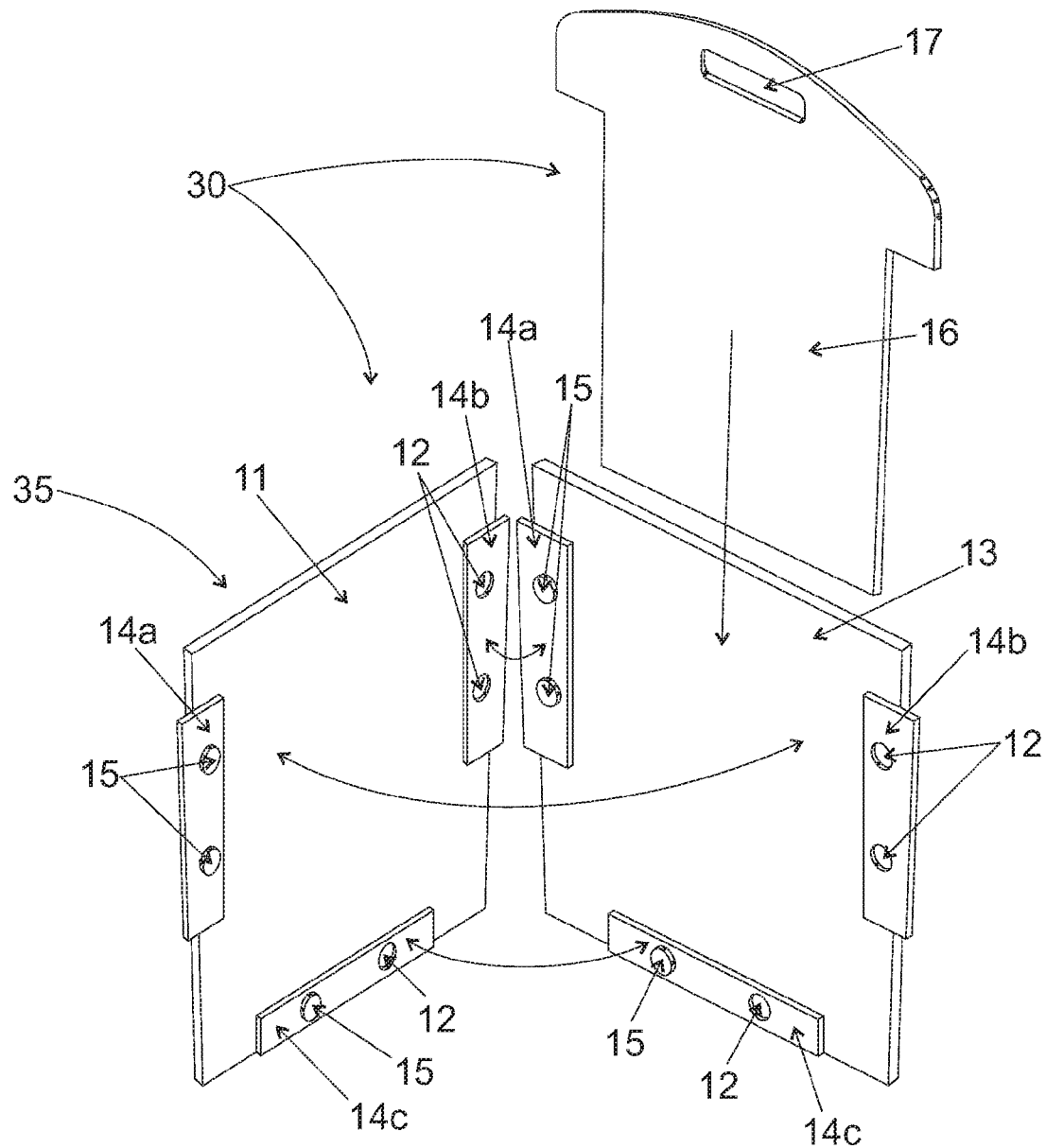
FIG. 2 is an enlarged partial schematic view of the system shown in FIG. 1.

Referring now to FIGS. 2, 3B and 3C, the cutting board system 30 comprises cutting board holding assembly 35 and a cutting board 16. The cutting board holding assembly 35 comprises a first vertical side wall 11 opposite a second vertical side wall 13, each having a plurality of fastening brackets 14a, 14b, 14c. Each vertical side wall 11, 13 is generally rectangular and comprises an upper end 10a opposite a lower end 10b, a left side 10c opposite a right side 10d, and an inside face 10e opposite an outside face 10f. Side walls 11, 13 may be made of any suitable material known in the art, including but not limited to polymers, metals, or wood. The vertical side walls 11, 13 have a width $W_{11, 13}$ sized to fit in a cooler 20 orthogonal to and between the front and back walls 25a, 25b, respectively.

The fastening brackets 14a, 14b, 14c comprise an inner edge 14i and an outer edge 14o and are disposed on the inside face 10e of the vertical side walls 11, 13. More specifically, a first fastening bracket 14a is disposed on the inside face 10e proximal to and extending past the side wall's left side 10c, and a second fastening bracket 14b is disposed on the inside face 10e proximal to and extending past the side wall's right side 10d. The distance $D_{14o}$ between the left or right side 10c, 10d, respectively, and the corresponding fastening bracket outer edge 14o is equivalent to or less than the depth $D_{18}$ of the channels 18 of the cooler 20. A third fastening bracket 14c is disposed on the inside face 10e proximal to the side wall's lower end 10b. The fastening brackets 14a, 14b, 14c may be molded into side walls 11, 13 or attached by any means standard in the art. The fastening brackets 14a, 14b, 14c include a fastening device or fastener 12, 15. Any fastening mechanism known in the art may be used for the fastener 12, 15 including, but not limited to snaps, hook-and-loop fasteners, or pegs. In the present embodiment, fasteners 12, 15 are pegs 15 with corresponding sockets 12. In the present embodiment, cutting board system 30 comprises a first, second, and third fastening bracket 14a, 14b, 14c, respectively; however, in other embodiments, cutting board system 30 may only comprise a first and second fastening bracket 14a, 14b, respectively.

Referring now to FIGS. 2 and 3A, the cutting board 16 is generally rectangular and comprises an upper end 16a opposite a lower end 16b, and a left side 16c opposite a right side 16d. The cutting board 16 further comprises an opening or handle 17 at upper end 16a for grasping and maneuvering the cutting board 16. In the present embodiment, cutting board 16 has a handle 17; however, in other embodiments, the cutting board need not have a handle 17. In the present embodiment, cutting board upper end 16a is curved; however in other embodiments, the cutting board upper end 16a may be straight or curved with a greater or lesser angle of curvature. Cutting board top end 16a further comprises two extensions 21 that protrude beyond the cutting board left and right sides 16c, 16d, respectively. The width $W_{16}$ of the cutting board 16 below the extensions 21 is less than the distance $D_{14i}$ between the first and second fastening brackets 14a, 14b, respectively. The cutting board 16 may be made of any material standard in the art including, but not limited to, polymers, wood, or glass.

Referring now to FIG. 1, individual dividers 40 are sized to fit in a cooler 20 orthogonal to and between the front and back walls 25a, 25b, respectively. The dividers 40 are disposed in opposing channels 18 and can be removed by grasping the divider 40 and lifting it upward to slidingly disengage the dividers from the channels 18. Dividers 40 are adapted for use with various models of cooler 20.

Referring now to FIG. 2, to deploy the cutting board system 30, the first and second opposing vertical side walls 11, 13 are coupled together such that the inside face 10e of each side wall 11, 13 face each other. More specifically, the first fastening bracket 14a of the first vertical side wall 11 couples to the second fastening bracket 14b of the second side wall 13; the second fastening bracket 14b of the first vertical side wall 11 couples to the first fastening bracket 14a of the second vertical side wall 13; and the third fastening brackets 14c of the first and second vertical side walls 11, 13, respectively, are coupled together. The coupled vertical side walls 11, 13, or cutting board holding assembly 35, define a receptacle or housing 37 sized to accommodate the cutting board 16.

The cutting board holding assembly 35 is then installed in the cooler 20. The cutting board holding assembly 35 has a height less than the height of the cooler 20 to allow lid 25f to close. The portions of the first and second fastening brackets 14a, 14b, respectively, that extend beyond the left and right side 10c, 10d of vertical side walls 11, 13 are inserted to slidingly engage opposing channels 18 of cooler 20. The cutting board 16 can then be inserted into the receptacle 37 by grasping handle 17; the inside edges 14i of the first and second fastening brackets 14a, 14b may also be used to guide the cutting board 16 into receptacle 37. The cutting board holding assembly 35 has a height less than a height of the cutting board 16.

The cutting board system 30 allows the user to have a cutting board 16 conveniently and readily accessible for cutting food, garnishments, bait, fish, or any number of other uses, eliminating the need to carry a standalone cutting board. Furthermore, the cutting board system 30 allows the cutting board holding assembly 35 to remain in place when the cutting board 16 is removed, thereby also maintaining a dividing function in the cooler 20. Thus, the cooler 20 can be divided into a food section, a drink section, sections for different kinds of drinks, or any other type of division which suits the user's purpose. In addition, the cutting board system 30 can be disassembled for easy cleaning.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order.

What is claimed is:

1. A cutting board system for use with a cooler having a plurality of interior, opposed vertical channels, the system comprising:
   a cutting board; and
   a cutting board holding assembly comprising:
      a first and second vertical side wall, each side wall having an inside face opposite an outside face and a left side opposite a right side;
      a first fastening bracket disposed on the inside face of each side wall proximate the left side, the first fastening bracket being attached only to the inside face and extending past the left side of each vertical side wall; and a second fastening bracket disposed on the inside face of each side wall proximate the right side, the second fastening bracket being attached only to the inside face and extending past the right side of each vertical side wall;

wherein the first fastening bracket has a first fastening device configured to engage a second fastening device on the second fastening bracket, wherein the inside faces of the first and second side walls and the fastening brackets define a receptacle configured to receive the cutting board;

wherein only the first and second fastening brackets are configured to slidingly engage two opposed vertical channels of the cooler.

2. The system of claim 1, wherein the cutting board comprises a handle proximal to a top end of the cutting board.

3. The system of claim 1, wherein the cutting board top end comprises extensions that protrude beyond opposing sides of the cutting board.

4. The system of claim 3, wherein the cutting board top end is curved.

5. The system of claim 1, wherein the first and second vertical side walls each further comprise a third fastening bracket disposed on the inside face of each side wall proximate a lower end, the third fastening bracket being attached only to the inside face.

6. The system of claim 1, wherein the cutting board holding assembly has a height less than a height of the cutting board.

7. A cooler system comprising:
an insulated cooler for storage of food and drink items having opposing front and back walls, opposing left and right walls, a bottom, a lid, and a plurality of opposing vertical channels disposed on the front and back walls;
a cutting board; and
a cutting board holding assembly comprising:
a first and second vertical side wall, each side wall having an inside face opposite an outside face and a left side opposite a right side;
a first fastening bracket disposed on and only in contact with the inside face of each vertical side wall, where the first fastening bracket is proximate to and extends past the left side of each vertical side wall; and
a second fastening bracket disposed on and only in contact with the inside face of each vertical side wall, where the second fastening bracket is proximate to and extends past the right side of each vertical side wall;

wherein the first fastening bracket has a first fastening device configured to engage a second fastening device on the second fastening bracket, wherein the inside faces of the first and second side walls and the fastening brackets define a receptacle configured to receive the cutting board;

wherein the first and second fastening brackets are configured to slidingly engage two opposed vertical channels of the front and back walls of the insulated cooler to dispose the first and second vertical side walls proximate the front and back walls of the insulated cooler.

8. The system of claim 7, wherein the cutting board comprises a handle proximal to a top end of the cutting board.

9. The system of claim 8, wherein the top end comprises extensions that protrude beyond opposing sides of the cutting board.

10. The system of claim 9, wherein the top end of the cutting board is curved.

11. The system of claim 7, wherein the first and second vertical side walls each further comprise a third fastening bracket disposed on and only in contact with the inside face of each side wall proximate a lower end, the third fastening bracket being attached only to the inside face.

12. The system of claim 7, wherein the cutting board system has a height less than a height of the cooler.

13. The system of claim 7, wherein the cutting board holding assembly has a height less than a height of the cutting board.

14. The system of claim 5, wherein each fastening device includes at least one of a peg and a socket.

15. The system of claim 5, wherein each fastening device comprises hook and loop fasteners.

16. The system of claim 5, wherein each fastening device is a press fit fastener.

17. The system of claim 11, wherein each fastening device includes at least one of a peg and a socket.

18. The system of claim 11, wherein each fastening device comprises hook and loop fasteners.

19. The system of claim 11, wherein each fastening device is a press fit fastener.

* * * * *